United States Patent Office 3,231,547
Patented Jan. 25, 1966

3,231,547
POLYMERIZATION OF OLEFINIC HYDRO-
CARBONS
Jules Darcy, Raymond A. Stewart, and Lloyd A. McLeod,
Sarnia, Ontario, Canada, assignors to Polymer Corporation Limited, Sarnia, Ontario, Canada
No Drawing. Filed Apr. 3, 1961, Ser. No. 100,012
Claims priority, application Canada, June 3, 1960,
800,341
10 Claims. (Cl. 260—85.3)

The present invention relates to the polymerization of olefinic hydrocarbon compounds. It relates particularly to the ionic copolymerization of isobutylene with polyolefinic hydrocarbon compounds to form copolymers thereof.

It is known that high molecular weight copolymers of isobutylene and isoprene may be obtained by copolymerizing these monomers in solution in an inert diluent at very low temperatures i.e. about −100° C., with the aid of Friedel-Crafts catalysts. These copolymers, more commonly known as butyl rubbers, may be vulcanized and are characterized by low unsaturation and high impermeability to gases. They have attained very wide commercial acceptance, particularly in the manufacture of air retaining liners for automobile tires.

Recently there have been developed novel processes for the polymerization of alpha-olefins while dissolved in inert diluents such as pentane and hexane, using specially prepared catalysts. These catalysts are commonly referred to as stereospecific catalysts and may be defined broadly as being complexes formed by mixing reducible heavy metal compounds with organo-metallic reducing agents. The heavy metals most frequently used are those of Groups IVB, VB and VIB of the Periodic Table as exemplified by titanium, vanadium and chromium. Typical reducible heavy metal compounds are the halides, oxyhalides, alkoxides, acetates, etc. of titanium, vanadium and chromium. The organo-metallic reducing agents most often used are those compounds based on the metals of Group IIIA of the Periodic Table with aluminum being preferred. Examples of such reducing agents are the trialkyls, dialkylmonohalides, monoalkyldihalides, hydrides, etc. of aluminum, gallium, indium and thallium.

Inert diluents such as pentane, hexane, heptane and benzene invariably have been present as solvent media for these polymerization reactions, and have been employed in amounts generally greater than 200% by weight and usually varying from 300–900% or more by weight with respect to the total weight of the monomeric reactants.

When attempts were made to copolymerize isobutylene with polyolefinic hydrocarbon compounds in these systems, it was found that not only were yields low but that copolymers could not be obtained. In other words, it was found that the bulk of the polymeric product obtained was comprised mostly of homopolymers of the polyolefinic hydrocarbon compound with the isobutylene remaining substantially unreacted.

It is the primary object of this invention to provide a process for obtaining high yields of copolymers of isobutylene with polyolefinic hydrocarbon compounds.

Another object is to prepare vulcanizable, high molecular weight, rubbery copolymers of isobutylene with polyolefinic hydrocarbon compounds by using a polymerization catalyst formed by mixing a reducible heavy metal compound with an organo-metallic reducing agent.

These and other objects of the present invention are attained by a process comprising contacting 75.0–99.9 parts by weight of isobutylene with 0.1–25.0 parts by weight of a polyolefinic hydrocarbon compound in the presence of a catalyst formed by mixing a reducible metal compound of a heavy metal from Groups IVB, VB and VIB of the Periodic Table with an organo-metallic reducing compound based on a metal from Group IIIA of the Periodic Table, the molar ratio of said organo-metallic reducing compound to said reducible heavy metal compound being less than 1.3, at a temperature lower than 0° C. in the presence of less than 200 parts by weight of inert reaction diluent per 100 parts by weight of polymerizable hydrocarbons.

In carrying out the copolymerization of the isobutylene with the polyolefinic hydrocarbon compound, it is convenient to premix the reactant monomers and to preform the catalyst before contacting the monomers with the catalyst. Alternatively, the catalyst may be formed within the liquid reactants by adding the catalyst components individually to the reactants in the absence of diluent. When the copolymerization is to be carried out in the presence of a diluent, it may be more convenient to preform the catalyst in part or all of the diluent prior to contacting with the monomers.

The employment of a diluent carries with it a prerequisite that the amount of diluent be restricted to less than 200 parts by weight per 100 parts by weight of reactant hydrocarbon compounds. Preferably, diluent usage should be limited to less than 100 parts by weight per 100 parts by weight of reactants since the yield of copolymer decreases with increasing solvent to monomer ratios.

While useful polymers may be produced by copolymerizing the isobutylene with any polyolefinic hydrocarbon compound, it is desirable that the polyolefine be a conjugated diolefine possessing a vinylidene group in its molecular structure. The most useful copolymers will be obtained with conjugated diolefines containing 4 carbon atoms in the unsaturated chain. Illustrative of the more suitable diolefine monomers are butadiene-1,3, pentadiene-1,3, 2-methyl butadiene-1,3, 2,3-dimethyl butadiene-1,3 and hexadiene-1,3. The preferred compounds are 2-methyl butadiene-1,3 and butadiene-1,3. The use of less than 25.0 parts by weight of polyolefine per 100 parts by weight of total monomers is preferred since the reaction rate is retarded with increasing amounts of polyolefine.

As indicated, the catalyst may be prepared by mixing a reducible metal compound of a heavy metal from Groups IVB, VB and VIB of the Periodic Table with an organo-metallic reducing compound based on a metal from Group IIIA of the Periodic Table. Typical reducible heavy metal compounds are the halides, oxyhalides, alkoxides, acetates of titanium, vanadium and chromium. Excellent results can be obtained with titanium tetrachloride. Examples of the organo-metallic reducing compounds are the trialkyls, alkyl halides and hydrides of aluminum, gallium, indium and thallium. Aluminum alkyls are generally to be preferred with excellent results being obtained with the less expensive compounds such as aluminum triisobutyl and aluminum triethyl. The amount of catalyst used is not critical but it does affect the reaction rate and molecular weight of the resulting polymer. Reaction rate increases and molecular weight drops with increasing amounts of catalyst. Thus the amount of catalyst employed will be influenced by the desired conditions for the reaction and properties of the desired polymer product.

While the amount of catalyst used is not critical, its composition is of some consequence. Thus in preparing the catalyst it is important to maintain the molar ratio of organo-metallic reducing compound to reducible heavy metal compound at a value lower than 1.3 and preferably below 1.0 since yields of copolymer begin to drop rather sharply as the ratio increases from 1.0 to 1.3.

The temperature at which the reaction is carried out affects the molecular weight of the polymers obtained. Thus when reaction temperatures are maintained below 0° C. and preferably below about −15° C. solid polymers of high molecular weight are obtained. As reaction temperatures rise above about −15° C. and especially above 0° C. the molecular weight of the recovered polymers decreases. Liquid polymers may be expected at reaction temperatures above about 25° C.

The following examples will serve to illustrate the invention more fully.

EXAMPLE I

*Polymerization of isobutylene with isoprene in presence of large amounts of solvent*

To each of three dry 7-ounce polymerization bottles previously flushed with nitrogen and capped there were added 40.0 cc. of dry benzene, 2.5 millimoles of pure aluminum triisobutyl and 2.5 millimoles of pure titanium tetrachloride. The contents were aged at room temperature for 30 minutes following which a further addition of 90 cc. of dry benzene was made to each bottle. Various amounts of isobutylene and isoprene were added to the bottles and polymerization was allowed to take place at 5° C. and 50° C. for 60 hours. 40 cc. of ethanol containing 0.5 weight percent of dissolved phneyl-beta-naphthylamine (PBNA) were then mixed with the contents of each bottle to stop the polymerization and precipitate the polymer. Each mixture was heated to boiling to extract and destroy the catalyst residue. The treatment with alcohol-PBNA solution was repeated to assure the recovery of a pure polymer containing a small amount of the PBNA antioxidant. The polymer obtained from each bottle was then thoroughly dried and subjected to infrared analysis to determine its composition. The results are summarized in Table I.

TABLE I

| Bottle | 1 | 2 | 3 |
|---|---|---|---|
| Solvent (benzene), cc. | 130 | 130 | 130 |
| Aluminum triisobutyl, millimoles | 2.5 | 2.5 | 2.5 |
| Titanium tetrachloride, millimoles | 2.5 | 2.5 | 2.5 |
| Isobutylene, cc. | 22.5 | 12.5 | 6.0 |
| Isoprene, cc. | 2.5 | 12.5 | 18.0 |
| Polymerization temp., ° C. | 5 | 50 | 5 |
| Polymerization time, hours | 60 | 60 | 60 |
| Yield, grams | 1.1 | 7.3 | 10.2 |
| Yield, weight percent on monomers | 7.0 | 43.0 | 64.2 |
| Weight percent isoprene in polymer | 99.5 | 99.5 | 100 |
| Weight percent isobutylene in polymer | 0.5 | 0.5 | 0 |

The infra-red analysis showed that the polymers are essentially all homopolyisoprenes with traces of isobutylene showing in the polymeric structure of Samples 1 and 2. These results indicate that no copolymers are obtained when isobutylene and isoprene are copolymerized at high solvent to monomer ratios.

A further series of four polymerizations were carried out to verify the foregoing results and to check the effect at lower solvent to monomer ratios. The results are summarized in Table II.

TABLE II

| Bottle | 1 | 2 | 3 | 4 |
|---|---|---|---|---|
| Solvent (pentane), cc. | 30 | 60 | 75 | 135 |
| Aluminum triisobutyl, millimoles | 2.5 | 2.5 | 2.5 | 2.5 |
| Titanium tetrachloride, millimoles | 2.5 | 2.5 | 2.5 | 2.5 |
| Isobutylene, cc. | 7.5 | 7.5 | 7.5 | 7.5 |
| Isoprene, cc. | 7.5 | 7.5 | 7.5 | 7.5 |
| Polymerization temp., ° C. | 13 | 13 | 13 | 13 |
| Polymerization time, hours | 16 | 16 | 16 | 16 |
| Yield, grams | 4.85 | 4.4 | 2.7 | 2.0 |
| Yield, wt. percent on monomers | 49.5 | 45.0 | 27.5 | 20.4 |
| Weight percent isoprene in polymer | 99 | 100 | 98 | 98 |

These results show that at solvent to monomer ratios as low as 2.0 only homopolyisoprene is formed and that the isobutylene monomer remains essentially unreacted.

EXAMPLE II

*Copolymerization of isobutylene with isoprene in the absence of solvent*

To a series of eight dry and capped 7-ounce polymerization bottles there were added by means of a syringe varying amounts of titanium tetrachloride and aluminum triisobutyl. The bottles were cooled to −75° C. and 40.0 cc. of isobutylene containing 3.0% by volume dissolved isoprene were added to each bottle. Polymerization was allowed to proceed at −75° C. for 40 hours. The polymer product in each bottle was purified and recovered with ethanol-PBNA solution as described in Example I. The results are summarized in Table III.

TABLE III

| Bottle | 1 | 2 | 3 | 4 | 5 | 6 | 7 | 8 |
|---|---|---|---|---|---|---|---|---|
| TiCl₄, millimoles | 4.0 | 4.0 | 4.0 | 4.0 | 2.0 | 2.0 | 2.0 | 2.0 |
| Al(isobutyl)₃, millimoles | 3.0 | 3.0 | 2.6 | 2.6 | 1.5 | 1.5 | 1.3 | 1.3 |
| Yield of polymer, grams | 23.4 | 20.9 | 22.1 | 22.2 | 21.2 | 21.0 | 21.9 | 19.8 |
| Yield, wt. percent on monomers | 93.9 | 83.9 | 88.7 | 89.1 | 85.2 | 84.3 | 88.0 | 79.5 |

Samples of the polymers obtained from bottles 5, 7 and 8 were compounded according to the recipe given in Table IV. Tensile strength, modulus, elongation and other tests were determined on each of the samples. These results are summarized in Table V.

TABLE IV

Parts by weight of polymer

| | |
|---|---|
| Polymer | 100 |
| Easy processing channel black | 50 |
| Zinc oxide | 5 |
| Stearic acid | 3 |
| Benzothiazyl disulfide | 0.5 |
| Tetramethyl thiuram disulfide | 1 |
| Sulfur | 2 |

TABLE V

| Vulcanization temperature | 307° F. | | |
|---|---|---|---|
| | Bottle 5 | Bottle 7 | Bottle 8 |
| Tensile strength (p.s.i.): | | | |
| 10' cure | | 1,005 | |
| 12.5' cure | 1,331 | | 1,567 |
| 20' cure | | 1,655 | |
| 25' cure | 1,163 | | 1,910 |
| 40' cure | | 1,796 | |
| 50' cure | 1,578 | | 1,788 |
| 80' cure | | 1,605 | |
| Modulus at 300% elongation (p.s.i.): | | | |
| 10' cure | | 375 | |
| 12.5' cure | 359 | | 568 |
| 20' cure | | 595 | |
| 25' cure | 551 | | 792 |
| 40' cure | | 870 | |
| 50' cure | 776 | | 1,125 |
| 80' cure | | 1,095 | |
| Elongation at break (percent): | | | |
| 10' cure | | 610 | |
| 12.5' cure | 810 | | 668 |
| 20' cure | | 645 | |
| 25' cure | 558 | | 592 |
| 40' cure | | 532 | |
| 50' cure | 550 | | 440 |
| 80' cure | | 410 | |
| Torsional hystersis (log dec. at 150° F.) | | 0.36 | |
| Volume swell (40' cure, in isooctane for 24 hours at 77° F.) | | 137.1 | |
| Intrinsic viscosity of raw polymer (toluene) | | 1.3 | |
| Molecular weight of raw polymer (Flory) | | 380,000 | |

The above results indicate that true copolymers of isobutylene with isoprene of high molecular weight are obtained in the absence of solvent during the polymerization process and that these copolymers may be compounded and cured to yield rubbery vulcanizates possessing attractive physical properties. The high yield of polymer indicates that the isobutylene is polymerizing since not enough isoprene was charged to give these yields. The high tensile strengths and increases in modulus with time of vulcanization indicate that isoprene was polymerized into the molecular structure of the polymer since polyisobutylene is not vulcanizable with sulfur.

EXAMPLE III

*Copolymerization of isobutylene with isoprene in the absence of solvent*

The polymerization of Example II was repeated using a 10% solution of isoprene in isobutylene. The results are summarized in Table VI.

TABLE VI

| Bottle | 1 | 2 | 3 | 4 | 5 | 6 | 7 | 8 | 9 | 10 |
|---|---|---|---|---|---|---|---|---|---|---|
| TiCl$_4$ (millimoles) | 2.0 | 2.0 | 2.0 | 2.0 | 2.0 | 2.0 | 2.0 | 2.0 | 2.0 | 2.0 |
| Al(isobutyl)$_3$ (millimoles) | 2.0 | 2.0 | 1.8 | 1.8 | 1.6 | 1.6 | 1.4 | 1.4 | 1.2 | 1.2 |
| Yield of polymer (grams) | 12.0 | 12.0 | 16.7 | 16.0 | 15.4 | 15.7 | 17.7 | 17.4 | 20.2 | 18.3 |
| Yield, wt. percent on monomers | 48.0 | 48.0 | 66.8 | 64.0 | 61.7 | 62.8 | 70.8 | 69.6 | 80.8 | 73.2 |
| Tensile strength, p.s.i. (40′ cure at 307° F.) | | | | | | 1,365 | | | | |

These results show that good yields of copolymers are obtained in the absence of solvent when higher proportions of diolefine are employed.

EXAMPLE IV

*Copolymerization of isobutylene with butadiene*

Twenty-one 7-ounce polymerization bottles were charged with 40.0 cc. of 5, 10 and 20 volume percent solutions of butadiene-1,3 in isobutylene and various ratios of titanium tetrachloride and aluminum triisobutyl catalyst components. The catalyst components were added to the bottles at room temperature in the presence of about 5 cc. of pentane. The bottles were cooled to −75° C. and the monomers previously cooled to −20° C., were then added. The polymerizations were allowed to proceed at −75° C. for 16 hours. The polymer product in each bottle was purified and recovered with ethanol-PBNA solution as described in Example I. Yield, percent unsaturation and intrinsic viscosity were determined on each sample.

The results are summarized in Table VII.

TABLE VII

| Bottle | 1 | 2 | 3 | 4 | 5 | 6 | 7 |
|---|---|---|---|---|---|---|---|
| TiCl$_4$, millimoles (1) | 2.0 | 2.0 | 2.0 | 2.0 | 2.0 | 2.0 | 2.0 |
| Al(isobutyl)$_3$, millimoles (2) | 0.66 | 0.99 | 1.32 | 1.65 | 1.98 | 2.31 | 2.64 |
| Ratio (2)/(1) | 0.33 | 0.50 | 0.66 | 0.83 | 0.99 | 1.16 | 1.32 |
| Volume percent butadiene-1,3 in monomers: | Yield, grams | | | | | | |
| 5% | 22.0 | 21.9 | 22.2 | 21.9 | 16.6 | 2.7 | 0.9 |
| 10% | 19.4 | 17.5 | 21.0 | 13.9 | 1.5 | 0.7 | |
| 20% | 12.5 | 11.4 | 11.8 | 6.9 | 0.9 | 0.6 | |
| | Mole percent unsaturation | | | | | | |
| 5% | 2.6 | 2.3 | 2.3 | 1.9 | 1.1 | | |
| 10% | 3.1 | 3.3 | 3.5 | 2.0 | | 1.2 | |
| 20% | 3.4 | 3.2 | 3.2 | 2.3 | | | |
| | Intrinsic viscosity, toluene | | | | | | |
| 5% | 1.4 | 1.4 | 1.5 | 1.4 | 0.86 | | |
| 10% | 1.2 | 1.1 | 1.2 | 1.1 | | 0.90 | |
| 15% | 0.91 | 0.91 | 0.86 | 0.95 | | | |

All polymers on which intrinsic viscosities were determined were completely or almost completely soluble in toluene.

These results indicate that best yields of polymers will be obtained at aluminum triisobutyl/titanium tetrachloride ratios below about 1.0 depending on the concentration of diolefin in the monomeric mixture.

The polymers obtained from bottles 1, 2, 3 and 4 in the series where 20 volume percent butadiene-1,3 was present in the monomeric mixture were compounded according to the recipe given in Table IV and vulcanized at 307° F. The vulcanizates were tested to determine their tensile strengths, percent elongations at break and moduli. The results are summarized in Table VIII.

TABLE VIII

| Bottle | Curing time, minutes at 307° F. | Modulus, p.s.i. at elongation of— | | | | Tensile strength, p.s.i. | Elongation, percent at break |
|---|---|---|---|---|---|---|---|
| | | 100% | 200% | 300% | 400% | | |
| 1 | 20 | 190 | 325 | 490 | 740 | 1,780 | 720 |
| | 40 | 225 | 370 | 650 | 990 | 1,975 | 650 |
| | 80 | 270 | 490 | 825 | 1,250 | 1,975 | 560 |
| 2 | 20 | 170 | 240 | 395 | 590 | 1,620 | 725 |
| | 40 | 195 | 340 | 560 | 850 | 1,900 | 680 |
| | 80 | 240 | 395 | 695 | 1,090 | 1,890 | 590 |
| 3 | 20 | 195 | 310 | 540 | 795 | 1,950 | 715 |
| | 40 | 240 | 440 | 735 | 1,110 | 2,090 | 620 |
| | 80 | 255 | 500 | 850 | 1,255 | 2,100 | 580 |
| 4 | 20 | 125 | 185 | 260 | 450 | 1,775 | 830 |
| | 40 | 165 | 255 | 410 | 650 | *1,250 | 560 |
| | 80 | 195 | 325 | 550 | 870 | 1,975 | 660 |

*Flaw in specimen.

These results show that copolymers of isobutylene with butadiene-1,3 are obtained and that these copolymers may be vulcanized to give products having attractive physical properties.

EXAMPLE V

*Copolymerization of isobutylene with isoprene in the presence of various amounts of solvent*

Forty-five 7-ounce polymerization bottles were charged with 40.0 cc. of isobutylene containing 3% by volume of dissolved isoprene. Various solvent/monomer and aluminum triisobutyl/titanium tetrachloride ratios were used. The polymerizations were carried out at −75° C. for 20 hours in three series of 15 bottles each. In series "A" the bottles were dried in an electric oven at 120° C., flushed with nitrogen while still hot, capped, cooled and pressurized with nitrogen before addition of the catalyst and monomeric components. In series "B" the bottles were not flushed or pressurized with nitrogen but merely capped while still hot after removal from the electric drying oven. In series "C" the bottles were dried in a steam oven at 75° C. and were not flushed or pressurized with nitrogen but merely capped while still hot as in series "B." The purpose of these various bottle treatments was to determine if traces of moisture and the presence of small amounts of oxygen would have any effect on the subsequent polymerizations.

The polymerizations were repeated using 5% and 10% by volume solutions of isoprene in isobutylene. The polymeric product in each bottle was purified and recovered as described in Example I. The polymeric products obtained from a number of the "A" series polymerizations were subjected to infra-red analysis to determine the weight percent isoprene in their molecular structures.

The results are summarized in Table IX.

TABLE IX

| Bottle | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Solvent—pentane, cc |  | 5 | 10 | 20 | 40 |  | 5 | 10 | 20 | 40 |  | 5 | 10 | 20 | 40 |
| $TiCl_4$—millimoles (1) | 2 | 2 | 2 | 2 | 2 | 2 | 2 | 2 | 2 | 2 | 2 | 2 | 2 | 2 | 2 |
| Al(isobutyl)$_3$, millimoles (2) | 1.4 | 1.4 | 1.4 | 1.4 | 1.4 | 2 | 2 | 2 | 2 | 2 | 2.6 | 2.6 | 2.6 | 2.6 | 2.6 |
| Solvent/monomer ratio | 0 | 0.1 | 0.25 | 0.5 | 1.0 | 0 | 0.1 | 0.25 | 0.5 | 1.0 | 0 | 0.1 | 0.25 | 0.5 | 1.0 |
| Ratio (2)/(1) | 0.7 | 0.7 | 0.7 | 0.7 | 0.7 | 1.0 | 1.0 | 1.0 | 1.0 | 1.0 | 1.3 | 1.3 | 1.3 | 1.3 | 1.3 |
| 3% isoprene: |  |  |  |  |  |  |  |  |  |  |  |  |  |  |  |
| Series "A" yield, grams | 17.8 | 19.9 | 10.4 | 11.9 | 15.8 | 4.1 | 4.6 | 1.4 | 1.0 | 2.9 | 0.2 | 0.2 | 0.2 | 0 0.2 | 0.2 |
| Series "A", wt. percent isoprene in polymer | 2.5 |  |  | 2.1 | 2.0 | 2.8 |  |  | .27 | 2.9 | 3.1 |  |  |  |  |
| Series "B" yield, grams | 18.2 | 18.3 | 10.4 | 11.9 | 8.3 | 13.2 | 1.0 | 0.6 | 1.0 | 1.2 | 5.5 | 3.7 | 0.2 | 0.2 | 0.2 |
| Series "C" yield, grams | 14.5 | 17.9 | 19.0 | 17.5 | 10.6 | 19.2 | 2.7 | 1.2 | 2.0 | 0.2 | 10.1 | 0.2 | 0.2 | 0.2 | 0.2 |
| 5% isoprene: |  |  |  |  |  |  |  |  |  |  |  |  |  |  |  |
| Series "A" yield, grams | 16.8 | 15.3 | 9.1 | 8.2 | 11.5 | 8.4 | 11.8 | 3.6 | 1.8 | 1.5 | 1.1 | 0.6 | 0.4 | 1.5 | 0.2 |
| Series "A", wt. percent isoprene in polymer | 4.0 |  |  | 3.6 | 4.2 | 4.4 |  | 4.3 |  | 4.2 | 3.5 |  |  |  |  |
| Series "B" yield, grams | 20.5 | 20.8 | 21.0 | 12.7 | 15.3 | 21.1 | 6.1 | 2.7 | 7.3 | 0.2 | 5.3 | 0.2 | 0.2 | 0.2 | 0.2 |
| Series "C" yield, grams | 12.6 | 11.6 |  | 15.4 | 5.9 | 12.4 |  | 6.0 | 0.6 | 3.2 | 15.9 | 0.2 | 0.2 | 0.2 | 0.2 |
| 10% isoprene: |  |  |  |  |  |  |  |  |  |  |  |  |  |  |  |
| Series "A" yield, grams | 17.8 | 19.9 | 10.4 | 11.9 | 15.8 | 4.1 | 4.6 | 1.4 | 1.0 | 2.9 | 0.2 | 0.2 | 0.2 | 0.2 | 0.2 |
| Series "A", wt. percent isoprene in polymer | 7.6 |  |  | 7.9 | 8.0 |  |  |  | 7.9 | 7.8 | 0.11 |  |  |  |  |
| Series "B" yield, grams | 18.2 | 18.3 | 10.4 | 11.9 | 8.3 | 13.2 | 1.0 | 0.6 | 1.2 | 1.2 | 5.5 | 3.7 | 0.2 | 0.2 | 0.2 |
| Series "C" yield, grams | 14.5 | 17.9 | 19.0 | 17.5 | 10.6 | 19.2 | 2.7 | 1.2 | 2.0 | 0.2 | 10.1 | 0.2 | 0.2 | 0.2 | 0.2 |

These results indicate that highest yields of copolymers are obtained when the solvent to monomer ratio is below about 1.0. They also show that when higher concentrations of diolefine are employed, best yields are obtained in the absence of solvent. They further show that the aluminum to titanium molar ratio should be kept below 1.3 and preferably below 1.0. Traces of moisture and small quantities of oxygen apparently have no deleterious effect on the polymerization reaction.

The embodiments of the invention in which an exclusive property or privilege is claimed are defined as follows:

1. A process comprising contacting 75.0–99.9 parts by weight of isobutylene with 0.1–25.0 parts by weight of a conjugated diolefinic compound containing a vinylidene group in the presence of a catalyst formed by mixing a reducible metal compound of a heavy metal from Groups IVB, VB and VIB of the Periodic Table with an organo-metallic reducing compound based on a metal from Group IIIA of the Periodic Table, the molar ratio fo said organo-metallic reducing compound to said reducible heavy metal compound being less than 1.0, at a temperature lower than 0° C., and in the presence of less than 100 parts by weight of inert reaction diluent per 100 parts by weight of polymerizable hydrocarbons.

2. The process according to claim 1, wherein the conjugated diolefinic compound is a hydrocarbon compound containing four carbon atoms in the unsaturated chain.

3. The process of claim 1, wherein the resulting reaction is allowed to proceed for not more than 50 hours at a temperature down to —100° C.

4. The process of claim 1 wherein there is no inert reaction diluent present during the polymerization.

5. The process of claim 1 wherein the temperature of polymerization is lower than —15° C.

6. The process of claim 1 wherein the organo-metallic reducing compound is an aluminum alkyl and the reducible heavy metal compound is a titanium halide.

7. A process comprising contacting 75.0–99.9 parts by weight of isobutylene and 0.1–25.0 parts by weight of a conjugated diolefinic hydrocarbon compound containing four carbon atoms in the unsaturated chain in the presence of a catalyst formed by mixing titanium tetrachloride with aluminium triisobutyl, the molar ratio of said aluminium triisobutyl to said titanium tetrachloride being less than 1.0, and in the presence of less than 100 parts by weight of inert reaction diluent per 100 parts by weight of polymerizable hydrocarbons, the resulting reaction being allowed to proceed for not more than 40 hours at a temperature between 0° C. and —80° C.

8. The process of claim 7, wherein the resulting reaction is allowed to proceed for from 16 to 20 hours at a temperature of the order of —75° C.

9. The process of claim 1 wherein the conjugated diolefinic hydrocarbon compound is 2-methyl butadiene-1,3.

10. The process of claim 1 wherein the conjugated diolefinic hydrocarbon compound is butadiene-1,3.

References Cited by the Examiner

UNITED STATES PATENTS

| 2,356,128 | 8/1944 | Thomas et al. | 260—85.3 |
| 2,682,531 | 6/1954 | Ernst et al. | 260—85.3 |
| 2,892,826 | 6/1959 | Peters et al. | 260—85.3 |
| 2,999,089 | 9/1961 | Short et al. | 260—85.3 |
| 3,058,963 | 10/1962 | Vandenberg | 260—94.8 |

FOREIGN PATENTS 827,365  2/1960  Great Britain.

OTHER REFERENCES

Gaylord and Mark: "Linear and Stereoregular Addition Polymers," Interscience Publishers, Inc., New York, 1959, pp. 384–385.

JOSEPH L. SCHOFER, *Primary Examiner.*

LEON J. BERCOVITZ, *Examiner.*